(12) United States Patent
Nelken

(10) Patent No.: US 6,961,720 B1
(45) Date of Patent: Nov. 1, 2005

(54) SYSTEM AND METHOD FOR AUTOMATIC TASK PRIORITIZATION

(75) Inventor: Yoram Nelken, Jerusalem (IL)

(73) Assignee: iPhrase Technologies, Inc., Bedford, MA (US)

( * ) Notice: Subject to any disclaimer, the term of this patent is extended or adjusted under 35 U.S.C. 154(b) by 202 days.

(21) Appl. No.: 10/008,152

(22) Filed: Dec. 4, 2001

Related U.S. Application Data

(63) Continuation of application No. 09/602,588, filed on Jun. 21, 2000, now Pat. No. 6,408,277.

(51) Int. Cl.[7] .......................... G06F 17/00; G06F 15/18
(52) U.S. Cl. .......................................... 706/47; 706/16
(58) Field of Search ..................... 706/47, 16

(56) References Cited

U.S. PATENT DOCUMENTS

| | | |
|---|---|---|
| 3,648,253 A | 3/1972 | Mullery et al. |
| 4,286,322 A | 8/1981 | Hoffman et al. |
| 4,642,756 A | 2/1987 | Sherrod |
| 4,658,370 A * | 4/1987 | Erman et al. .................. 706/60 |
| 4,805,107 A | 2/1989 | Kieckhafer et al. |
| 4,814,974 A | 3/1989 | Narayanan et al. |
| 4,942,527 A | 7/1990 | Schumacher |
| 5,040,141 A | 8/1991 | Yazima et al. |
| 5,068,789 A | 11/1991 | van Vliembergen |
| 5,099,425 A | 3/1992 | Yuji et al. |
| 5,101,349 A | 3/1992 | Tokuume et al. |
| 5,210,872 A | 5/1993 | Ferguson et al. |
| 5,228,116 A * | 7/1993 | Harris et al. .................. 706/50 |
| 5,230,054 A | 7/1993 | Tamura |
| 5,247,677 A | 9/1993 | Welland et al. |
| 5,251,131 A | 10/1993 | Masand et al. |
| 5,265,033 A | 11/1993 | Vajk et al. |
| 5,321,608 A | 6/1994 | Namba et al. |
| 5,325,526 A | 6/1994 | Cameron et al. |
| 5,369,570 A | 11/1994 | Parad |
| 5,371,807 A | 12/1994 | Register et al. |
| 5,377,354 A | 12/1994 | Scannell et al. |
| 5,437,032 A | 7/1995 | Wolf et al. |
| 5,483,466 A | 1/1996 | Kawahara et al. |
| 5,487,100 A | 1/1996 | Kane |
| 5,493,692 A | 2/1996 | Theimer et al. |
| 5,526,521 A | 6/1996 | Fitch et al. |
| 5,542,088 A | 7/1996 | Jennings, Jr. et al. |
| 5,559,710 A | 9/1996 | Shahraray et al. |

(Continued)

FOREIGN PATENT DOCUMENTS

WO     WO 00/36487 A2     6/2000

OTHER PUBLICATIONS

Webster's Third New International Dictionary, G.&C. Meriam Company, 1961, pp. 538, 834, 1460.

(Continued)

*Primary Examiner*—George Davis
(74) *Attorney, Agent, or Firm*—Carr & Ferrell LLP

(57) ABSTRACT

A system and method for electronic communication management comprises a universal data model, a modeling engine, and an adaptive knowledge base. The modeling engine includes a natural language processor and a statistical modeler. A communication is translated from its native format into the universal data model. The modeling engine determines the intent of the communication using the natural language processor and the statistical modeler. A response is generated, either automatically or by an agent. An audit module analyzes each response and provides feedback to the modeling engine and the adaptive knowledge base. The modeling engine uses the feedback to update models in the adaptive knowledge base. The modeling engine supports various application specific modules.

3 Claims, 5 Drawing Sheets

U.S. PATENT DOCUMENTS

| | | | |
|---|---|---|---|
| 5,596,502 | A | 1/1997 | Koski et al. |
| 5,630,128 | A | 5/1997 | Farrell et al. |
| 5,636,124 | A | 6/1997 | Rischar et al. |
| 5,687,384 | A | 11/1997 | Nagase |
| 5,694,616 | A | 12/1997 | Johnson et al. |
| 5,745,736 | A | 4/1998 | Picart |
| 5,761,631 | A | 6/1998 | Nasukawa |
| 5,864,848 | A | 1/1999 | Horvitz et al. |
| 5,878,385 | A | 3/1999 | Bralich et al. |
| 5,878,386 | A * | 3/1999 | Coughlin ............... 704/10 |
| 5,940,612 | A | 8/1999 | Brady et al. |
| 5,944,778 | A | 8/1999 | Takeuchi et al. |
| 5,974,465 | A | 10/1999 | Wong |
| 5,995,513 | A | 11/1999 | Harrand et al. |
| 5,999,990 | A | 12/1999 | Sharrit et al. |
| 6,021,403 | A | 2/2000 | Horvitz et al. |
| 6,035,104 | A | 3/2000 | Zahariev |
| 6,058,389 | A | 5/2000 | Chandra et al. |
| 6,061,709 | A | 5/2000 | Bronte |
| 6,067,565 | A | 5/2000 | Horvitz |
| 6,070,149 | A * | 5/2000 | Tavor et al. ............ 705/26 |
| 6,092,095 | A | 7/2000 | Maytal |
| 6,115,734 | A | 9/2000 | Mansion |
| 6,138,139 | A | 10/2000 | Beck et al. |
| 6,148,322 | A | 11/2000 | Sand et al. |
| 6,151,538 | A | 11/2000 | Bate et al. |
| 6,182,059 | B1 | 1/2001 | Angotti et al. |
| 6,182,120 | B1 | 1/2001 | Beaulieu et al. |
| 6,185,603 | B1 | 2/2001 | Henderson et al. |
| 6,212,544 | B1 | 4/2001 | Borkenhagen et al. |
| 6,223,201 | B1 | 4/2001 | Reznak |
| 6,243,735 | B1 | 6/2001 | Imanishi et al. |
| 6,260,058 | B1 | 7/2001 | Hoenninger et al. |
| 6,282,565 | B1 | 8/2001 | Shaw et al. |
| 6,301,602 | B1 | 10/2001 | Ueki |
| 6,308,197 | B1 | 10/2001 | Mason et al. |
| 6,314,446 | B1 | 11/2001 | Stiles |
| 6,327,581 | B1 | 12/2001 | Platt |
| 6,360,243 | B1 | 3/2002 | Lindsley et al. |
| 6,408,277 | B1 * | 6/2002 | Nelken ............... 705/9 |
| 6,411,947 | B1 | 6/2002 | Rice et al. |
| 6,411,982 | B2 | 6/2002 | Williams |
| 6,418,458 | B1 | 7/2002 | Maresco |
| 6,424,995 | B1 | 7/2002 | Shuman |
| 6,442,542 | B1 * | 8/2002 | Ramani et al. ............ 707/3 |
| 6,442,589 | B1 | 8/2002 | Takahashi et al. |
| 6,493,694 | B1 * | 12/2002 | Xu et al. ............ 706/47 |
| 6,654,726 | B1 * | 11/2003 | Hanzek ............ 705/26 |
| 2001/0027463 | A1 | 10/2001 | Kobayashi |
| 2001/0042090 | A1 | 11/2001 | Williams |
| 2001/0056456 | A1 | 12/2001 | Cota-Robles |
| 2002/0032715 | A1 | 3/2002 | Utsumi |
| 2002/0052907 | A1 | 5/2002 | Wakai et al. |
| 2002/0065953 | A1 | 5/2002 | Alford et al. |
| 2002/0073129 | A1 | 6/2002 | Wang et al. |
| 2002/0078119 | A1 | 6/2002 | Brenner et al. |
| 2002/0078121 | A1 | 6/2002 | Ballantyne |
| 2002/0078257 | A1 | 6/2002 | Nishimura |
| 2002/0083251 | A1 | 6/2002 | Chauvel et al. |
| 2002/0087618 | A1 | 7/2002 | Bohm et al. |
| 2002/0087623 | A1 | 7/2002 | Eatough |
| 2002/0091746 | A1 | 7/2002 | Umberger et al. |

OTHER PUBLICATIONS

Computer Dictionary, Microsoft Press, 1997, Third Edition, p. 192.

Breese et al, "Empirical Analysis of Predictive Algorithms for Collaborative Filtering," Proc. of the 14th Conf. on Uncertainty in Artificial Intelligence, Jul. 1998.

Czerwinski et al, "Visualizing Implicit Queries for Information Management and Retrieval," Proc. of CHI 1999; ACM SIGCHI Conf. on Human Factors in Computing Systems, 1999.

Dumais et al., "Inductive Learning Algorighms and Representations for Task Categorization," Proc. of 7th Intl. Conf. on Information & Knowledge Management, 1998.

Horvitz, "Principles of Mixed-Initiative User Interfaces," Proc. of CHI 1999; ACM SIGCHI Conf. on Human Factors in Computing Systems, 1999.

Horvitz et al., "Display of Information for Time-Critical Decision Making," Proc. of the 11th Conf. on Uncertainty in Artificial Intelligence, Jul. 1995.

Horvitz et al., "The Lumiere Project: Bayesian User Modeling . . . ," Proc. of the 14th Conf. on Uncertainty in Artificial Intelligence, Jul. 1998.

Horvitz et al., "Time-Dependent Utility and Action Under Uncertainty," Proc. of the 7th Conf. on Uncertainty in Artificial Intelligence, Jul. 1991.

Horvitz et al., "Time-Critical Action: Representations and Application," Proc. of the 13th Conf. on Uncertainty in Artificial Intelligence, Jul. 1997.

Koller et al., "Toward Optimal Feature Selection," Proc. of 13th Conf. on Machine Learning, 1996.

Lieberman, "Letizia: An Agent That Assists in Web Browsing," Proc. of International Joint Conference on Artificial Intelligence, 1995.

Platt, "Fast Training of Support Vector Machines Using Sequential Minimal Optimization," Advances in Kernel Methods: Support Vector Learning, MIT Press, Cambridge, MA, 1999.

Platt, "Probabilistic Outputs for Support Vector Machines & Comparisons to Regularized Likelihood Methods," Adv. in Large Margin Classifiers, MIT Press, Cambridge, MA, 1999.

Sahami et al. "A Bayesian Approach to Filtering Junk E-Mail," Amer. Assoc. for Art. Intell. Technical Report WS-98-05, 1998.

Cohen, "Learning Rules that Classify E-Mail," AT&T Laboratories, 1996.

Lewis, "Evaluating and Optimizing Autonomous Text Classification Systems,"ACM SIGIR, 1995.

Lewis et al., "Training Algorithms for Linear Text Classifiers," ACM SIGIR, 1996.

Apte et al., "Automated Learning of Decision Rules for Text Categorization," ACM Transactions on Information Systems, vol. 12, No. 3, 1994.

Losee, Jr., "Minimizing Information Overload: The Ranking of Electronic Messages,"Journal of Information Science 15, 1989.

Joachimes, "Text Categorization with Support Vector Machines: Learning with Many Relevant Features," Universitat Dortmund, Germany, 1998.

* cited by examiner

SYSTEM AND METHOD FOR AUTOMATIC TASK PRIORITIZATION

This application is a continuation of application Ser. No. 09/602,588 filed Jun. 12, 2000, U.S. Pat. No. 6,408,277.

BACKGROUND OF THE INVENTION

1. Field of the Invention

This invention relates generally to electronic systems, and relates more particularly to a system and method for automatic task prioritization.

2. Description of the Background Art

Many organizations are under a constant barrage of interactions with customers, suppliers, partners, and others. These organizations typically have a limited number of resources to process all of the incoming information and tasks in a timely manner. This problem is exacerbated when the interactions occur via multiple channels and over a wide geographic area. An organization may receive and send information via telephone, facsimile, electronic mail, and other electronic communication forms.

Incoming interactions may be processed on a first-come, first-served basis. This approach may be adequate for some organizations, when the quantity of interactions is relatively small. However, for organizations that process a large number of interactions, an interaction that requires an immediate resolution or response may be delayed due to the number of interactions ahead of it in the system. This and other limitations may prevent the organization from providing excellent service.

Similar to a hospital emergency room, incoming information and tasks may be triaged, whereby items having higher priorities than the others are processed first. Typically, an agent determines which information and tasks are more important and prioritizes them accordingly. When an organization processes hundreds, and perhaps thousands, of interactions a day, efficiently prioritizing the information and tasks at hand likely requires a large number of agents. However, a large number of agents is no assurance that information and tasks will be prioritized efficiently and accurately. Thus, a system and method for automatic task prioritization is needed.

SUMMARY OF THE INVENTION

The present invention provides a system and method to automatically prioritize tasks. The invention includes one or more task queues, a monitoring module, and a decision engine. The decision engine receives tasks and assigns a priority code to each task. A task may be an action that is to be performed by an agent or an electronic system. Alternatively, a task may be a piece of data that must be acted upon in some fashion, for example a news item received by a news service or a piece of intelligence data received by an intelligence gathering organization.

In one embodiment, the decision engine includes a task parser that analyzes and parses each task into concepts and relationships between the concepts. In one embodiment, the task parser includes a natural language processor for parsing text-based tasks expressed in natural language.

Each task is inserted into the task queue or queues according to its priority code and the priority codes of other tasks which may be present in the task queue. Agents select tasks to perform from the task queues according to priority guidelines established by a system user. The monitoring module monitors the order of the tasks selected by the agents and each task's priority code. The monitoring module feeds back this information to the decision module.

In one embodiment, the decision module is a learning system that uses feedback from the monitoring module to update stored priority data. The decision module learns the priority guidelines of the system user by learning from the order in which agents select tasks from the task queue. Thus, a system user may adjust its priority guidelines and, based on the selections of the agents, the decision engine will automatically update its priority data.

In another embodiment, the decision engine may be a rule-based system that prioritizes tasks according to a predetermined set of rules. In this embodiment, a change in the system user's priority guidelines requires changes to the rules of the decision engine. In a further embodiment of the invention, the decision engine may include a rule-based system that is supplemented by a learning system. In this embodiment, rules may be used to determine priorities of tasks until the learning system has received sufficient feedback to make priority decisions, or the rules may establish general guidelines that are further refined by feedback.

DETAILED DESCRIPTION OF THE PREFERRED EMBODIMENT

The present invention relates to an improvement in task prioritization in electronic devices.

Figure 1:
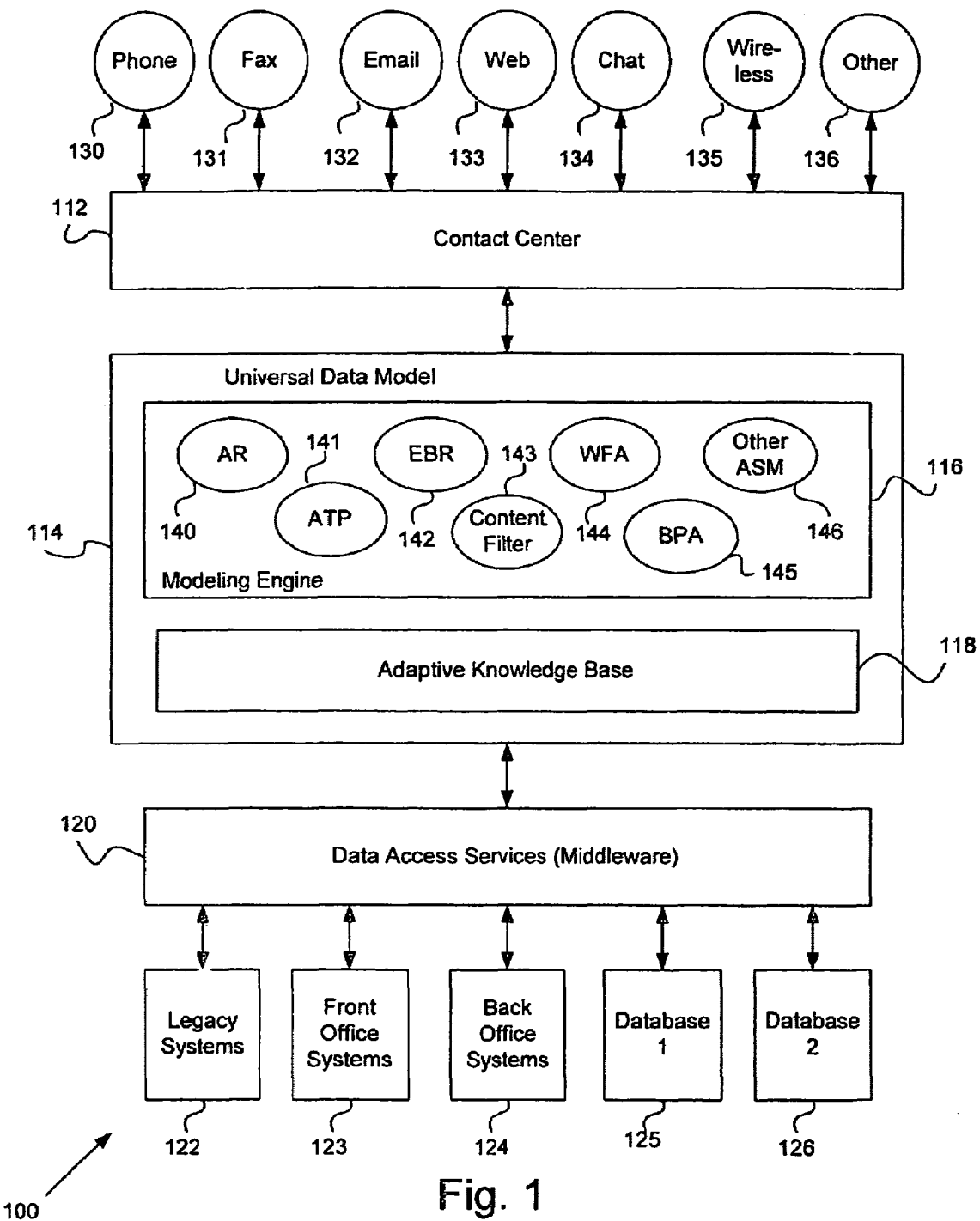
FIG. 1 is a block diagram of one embodiment of an electronic interaction system, in accordance with the present invention.

FIG. 1 is a block diagram of one embodiment of an electronic interaction system 100 which includes, but is not limited to, a contact center 112, an operations center 114, and an agent pool 116. System 100 may also include data access services 120 (middleware), legacy systems 122, front office systems 123, back office systems 124, and databases 125, 126. Contact center 112 may interact with other parties via various communication channels. The channels include, but are not limited to, a telephone (phone) 130 channel, a facsimile (fax) 131 channel, an E-mail 132 channel, a web-based communication (web) 133 channel, a chat communication (chat) 134 channel, and a wireless 135 channel. Other 136 forms of communication channels, for example, a news wire service, are within the scope of the invention.

Communications received by contact center 112 may be in the form of tasks. Although tasks in particular are discussed here, other types of text-based communications, for example remote employees' reports, are within the scope of the invention. Contact center 112 may also receive voice communications that require some action by an agent. Contact center 112 may include a speech recognition module that converts a voice communication into a text communication.

A task may be an action that is to be performed by an agent or an electronic system. Alternatively, a task may be a piece of data that must be acted upon in some fashion, for example a news item. A skilled person typically determines whether each received news item should be disseminated, archived, or otherwise processed. In another embodiment of the invention, system 100 may be utilized by an intelligence gathering organization, and a task may be an intelligence item. A skilled person typically determines whether each received intelligence item should be immediately forwarded to supervisory personnel or routed through routine channels.

Contact center 112 forwards tasks to operations center 114. Agents 140–144 in agent pool 116 select via path 160 tasks that are received by operations center 114. Each agent 140–144 is preferably a skilled person trained to perform the types of tasks typically received by system 100. Although only five agents are shown in FIG. 1, agent pool 116 may include any number of agents.

Data access services 120 may access legacy systems 122, front office systems 123, back office systems 124, and databases 125, 126 to store and retrieve data. Data access services 120 also communicates via path 164 with agent pool 116 to provide information needed by agents 140–144 to act upon the incoming tasks. In addition, the tasks acted upon by agents 140–144 may result in changes to data stored in system 100. Data access services 120 may also provide information to operations center 114.

Figure 2:
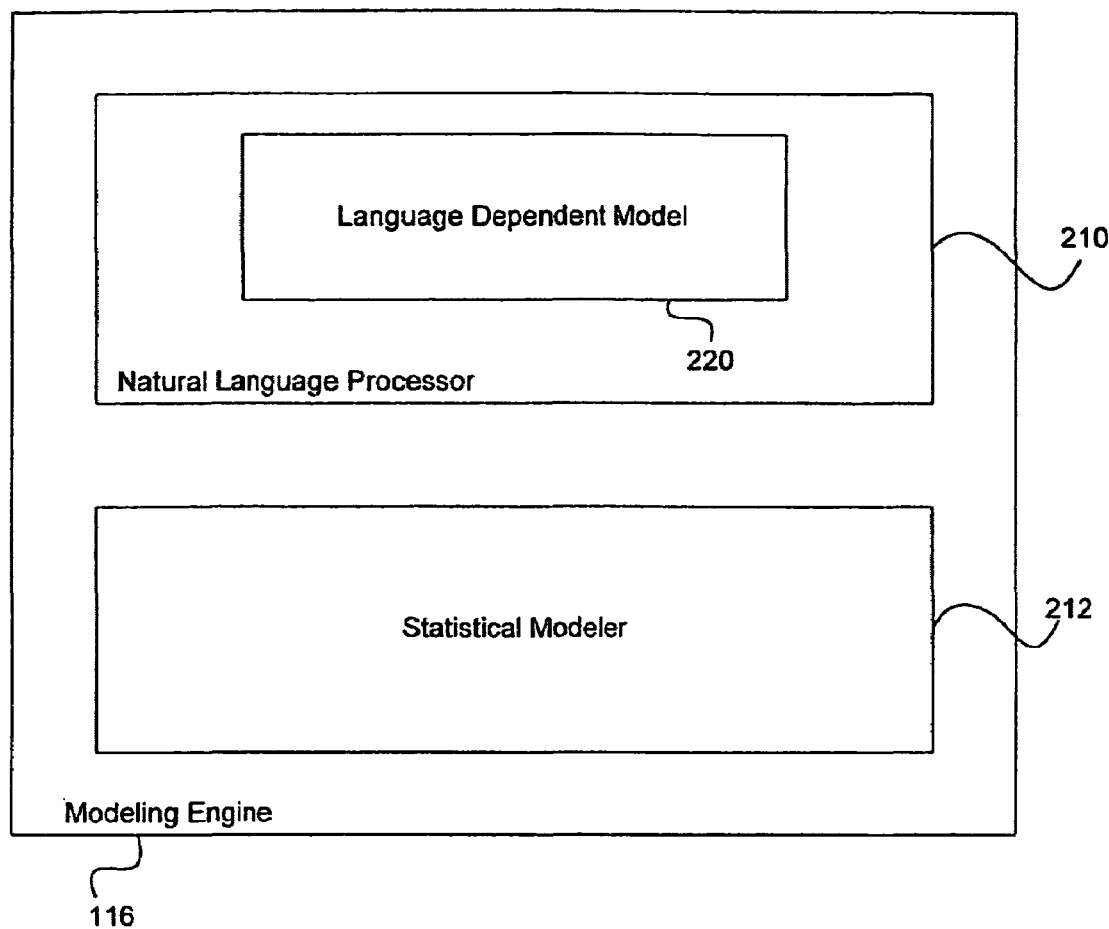
FIG. 2 is a block diagram of one embodiment of the operations center of FIG. 1, in accordance with the invention.

FIG. 2 is a block diagram of one embodiment of the operations center 114 of FIG. 1, in accordance with the invention. Operations center 114 includes, but is not limited to, a task queue 210, a decision engine 212, a monitoring module 214, and an agent interface 216. Although only one task queue 210 is shown in FIG. 2, operations center 114 may include a plurality of task queues, where each task queue is configured to store a certain type of task or kind of information. For example, in an intelligence gathering organization, operations center 114 may include a task queue 210 for each of several different geographical regions.

Decision engine 212 receives tasks via path 150 from contact center 112. Decision engine 212 analyzes and assigns a priority code to each task. Decision engine 212 may also receive data via path 154 from data access services 120. Data received via path 154 is preferably associated with a particular task. The contents and functionality of decision engine 212 are further discussed below in conjunction with FIG. 3.

Decision engine 212 sends each task, via path 220, to task queue 210 which stores each task until the task is selected and acted upon by an agent 140–144. The tasks in task queue 210 are ranked from highest priority to lowest priority according to the priority code assigned by decision engine 212. Each incoming task is stored in task queue 210 according to the task's priority code, and how that priority code compares to priority codes of other tasks that may be present in task queue 210. Thus, the order of tasks in task queue 210 may be rearranged with every incoming task.

Each agent 140–144, via agent interface 216 and path 222, selects tasks to perform according to a judgment of priority. Each agent's judgment of priority is based on and preferably in accordance with priority guidelines established by the system user. Variations among the selections of the various individual agents are averaged across the total number of agents. Thus, an individual agent's personal judgment of priority will not unduly skew the overall priority criteria of system 100.

Monitoring module 214 monitors via path 224 the tasks selected by each agent 140–144. Each selected task and its priority code are noted by monitoring module 214 and fed back via path 226 to decision engine 212. Decision engine 212 analyzes the order in which the tasks were selected from task queue 210.

By placing tasks in task queue 210 according to priorities, decision engine 212 advantageously allows agents 140–144 to more efficiently identify and process tasks having high priority. This advantage is especially apparent when task queue 210 contains a large number of tasks. In many instances, agents 140–144 will select tasks to act upon in an order which is consistent with decision engine's 212 determination of priority. However, the priority of each task in task queue 210 may be fine-tuned by an agent's personal judgment of priority. The impact of an agent's 140–144 judgment of priority is further discussed below in conjunction with FIG. 3.

Figure 3:
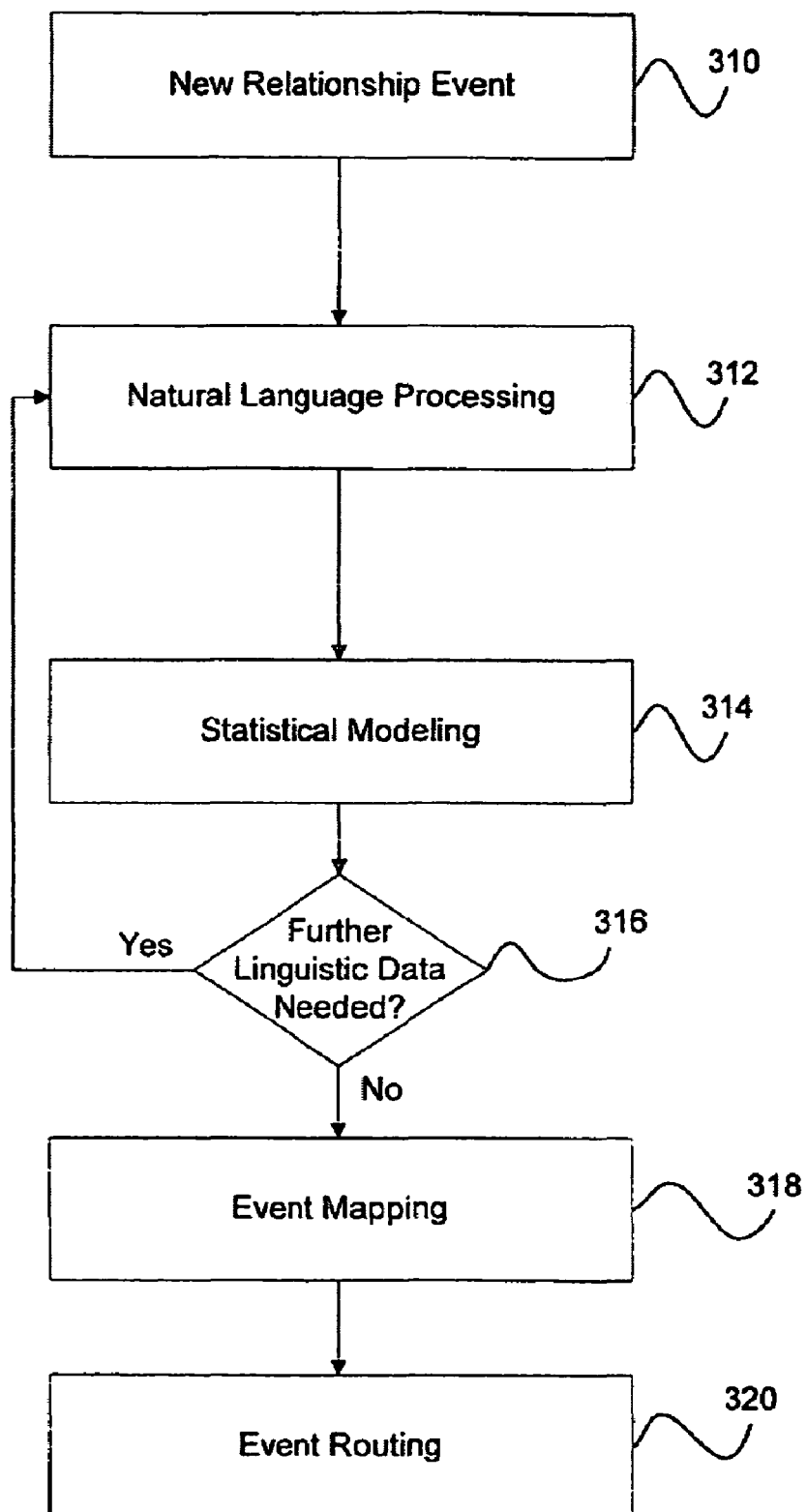
FIG. 3 is a block diagram of one embodiment of the decision engine of FIG. 2, in accordance with the invention.

FIG. 3 is a block diagram of one embodiment of the FIG. 2 decision engine 212 in accordance with the invention. The FIG. 3 embodiment of decision engine 212 includes, but is not limited to, a task parser 312 and a priority module 314. Task parser 312 receives tasks via path 150 from contact center 112.

In the FIG. 3 embodiment, task parser 312 analyzes content each task.

Task parser 312 parses each task into concepts, and may also identify relationships between the concepts. Concepts may be as general as single words from e-mail texts, or may be as specific as field descriptors from a web-based form. Task parser 312 preferably includes a natural language processor that analyzes content of text communications expressed in natural language. In another embodiment, task parser 312 identifies keywords in each task to determine content of the task.

Task parser 312 may also include a voice communication processor (not shown) that analyzes tasks received via a voice-based channel, where these voice tasks were not converted to text by contact center 112. The voice communication processor may be configured to detect emotional content of a voice task as well as to parse the task into concepts. Emotional content such as stress or anger may correspond to priority criteria that indicate a high priority.

Task parser 312 sends parsed tasks via path 320 to priority module 314. Priority module 314 compares the parsed tasks with its priority data and assigns a priority code to each task. In one embodiment, the priority code may represent one of a limited number of priority levels, for example "very low," "low," "medium," "high," and "very high." In another embodiment, the priority code may be expressed as a percentage, for example 0% to indicate the lowest priority and 100% to indicate the highest priority. Other schemes for expressing priorities of tasks are within the scope of the present invention.

Priority of tasks may be determined based on the nature of the tasks received by system 100 and priority guidelines established by a system user. For example, if the system user is a financial institution, then the tasks received by system 100 may be fund transfers, loan applications, or other similar types of tasks. Priority for these types of tasks may be based on service level agreements with customers, dollar amounts mentioned in the tasks, and other similar criteria.

In another example, an interaction may have high priority if it contains a threat to initiate a legal action or a threat of violence. If the system user is a news service, priority may be based on geographic region, mention of a particular individual, or subject matter such as crime, politics, or lifestyle.

In the preferred embodiment, priority module 314 is a learning system. One such learning system is described in U.S. Provisional Application No. 60/176,411, filed Jan. 13, 2000, entitled "System and Method for Effective and Efficient Electronic Communication Management," which is hereby incorporated by reference. Priority module 314 learns which tasks are considered more important than other tasks based on the order in which tasks are selected from task queue 210 by agents 140. Priority module 314 receives feedback via path 226 from monitoring module 214. The feedback may be positive or negative. Feedback may be considered positive if a selected task has a priority code that is lower than the priority codes of preceding selected tasks. Feedback may be considered negative if a selected task has a priority code that is higher than the priority codes of preceding selected tasks.

Priority module 314 utilizes the feedback to update stored priority data. In this embodiment, a system user need only indicate to agents 140–144 any changes in priority criteria, and priority module 314 learns the new criteria via feedback. In this way, agents' 140–144 judgments of priority adjust the priority criteria of priority module 314. Thus, when the system user indicates changes in priority criteria, system 100 may remain online with no interruptions in operation.

Since, in the preferred embodiment, priority module 314 is a learning system, new types of tasks may be received by system 100 and based on the selections of agents 140–144, priority module 314 learns how the priority of the new type of task compares to the priorities of other tasks. Thus, system 100 may receive and learn to prioritize new types of tasks with no interruptions in operation.

In another embodiment, priority module 314 is a rule-based system. Priority module 314 assigns a priority code to a task according to a predetermined set of rules. An exemplary rule may be that tasks associated with a dollar amount above five hundred dollars will have a higher priority than tasks associated with a lesser dollar amount. These rules typically remain unchanged until the system user affirmatively changes them. In the rule-based embodiment, priority module 314 may also receive feedback from monitoring module 214. The feedback may be periodically compared to the rules to determine if a rule may need to be modified. The rules may establish general guidelines that are refined by feedback.

Figure 4:
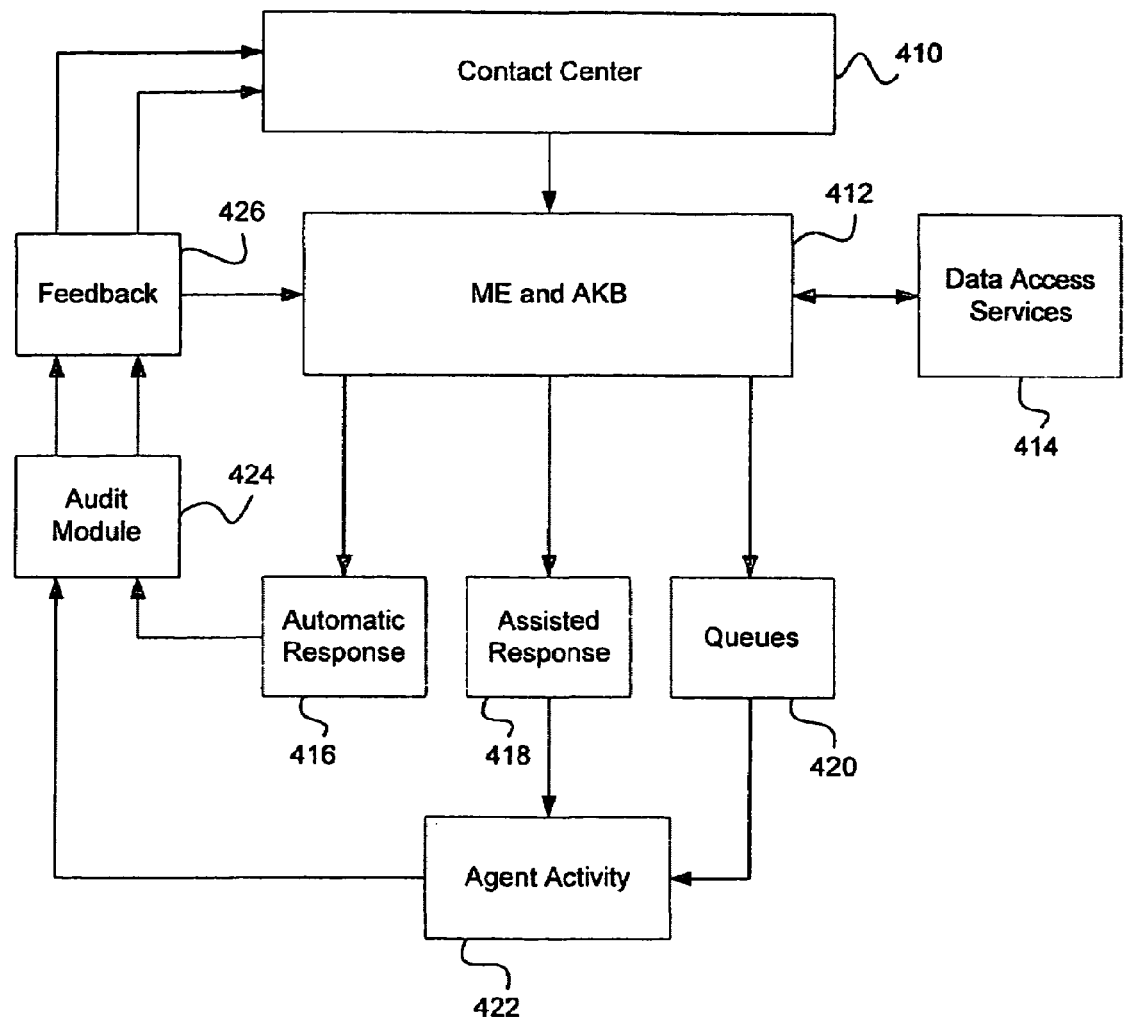
FIG. 4 is a flowchart of method steps for performing automatic task prioritization, in accordance with one embodiment of the invention.

FIG. 4 is a flowchart of method steps for performing automatic task prioritization in accordance with one embodiment of the invention. First, in step 410, operations center 114 receives a task from contact center 112. In step 412, decision engine 212 parses the task into concepts and the relationships between the concepts. Alternatively, decision engine 212 identifies keywords in the task. Then, in step 414, priority module 314 (FIG. 3) compares the parsed task with priority criteria. In the preferred embodiment, priority module 314 learns the priority criteria from feedback. In another embodiment, priority module 314 compares the parsed task with a predetermined set of rules for assigning priority.

In step 416, priority module 314 determines the priority of the task and assigns it a priority code. Then, in step 418, priority module 314 sends the task and priority code to task queue 210, inserting the task in task queue 210 according to the priority code of the task and the priority codes of any other tasks that may be in task queue 210.

Figure 5:
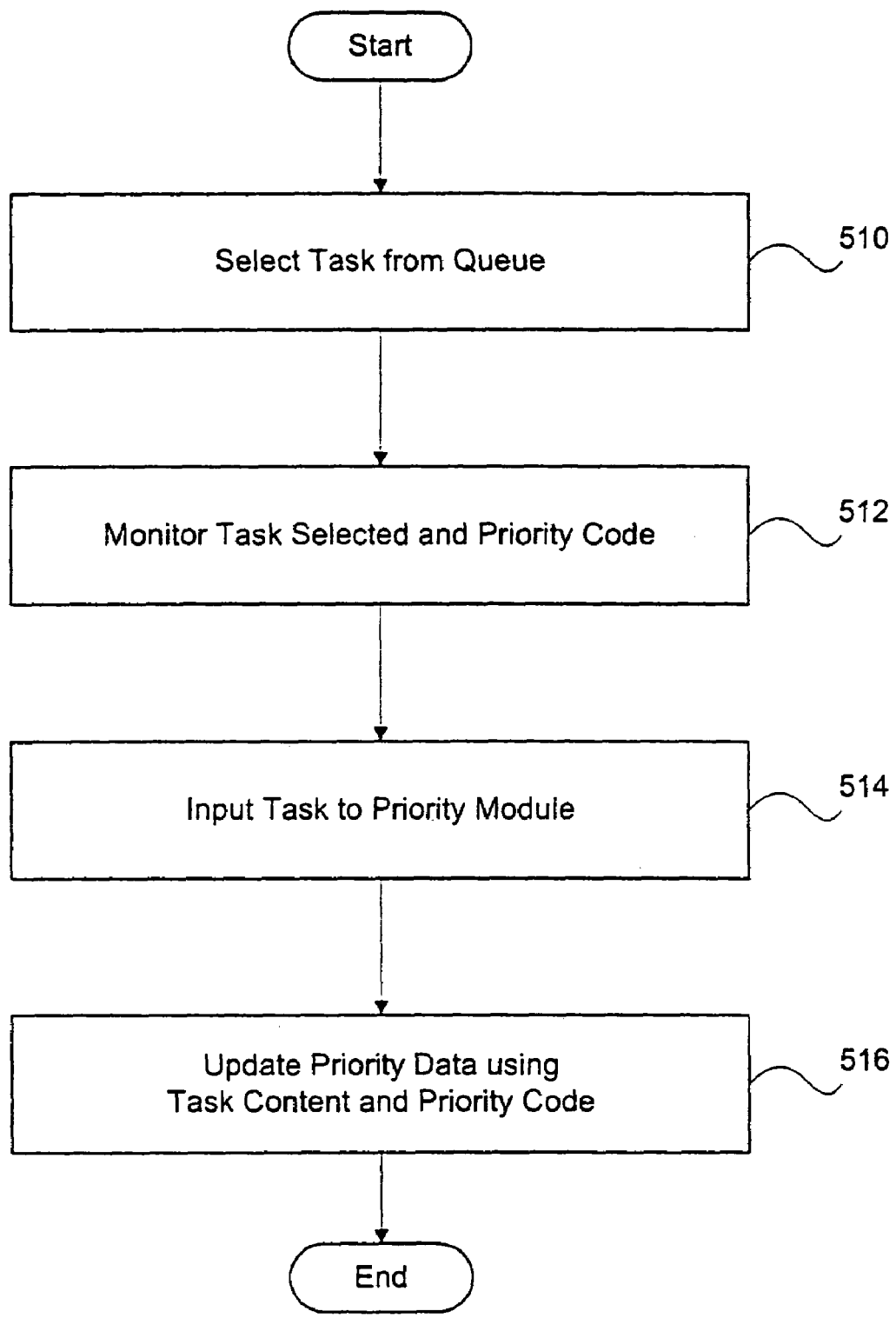
FIG. 5 is a flowchart of method steps for updating the operations center of FIG. 1, in accordance with one embodiment of the invention.
Figure 1:
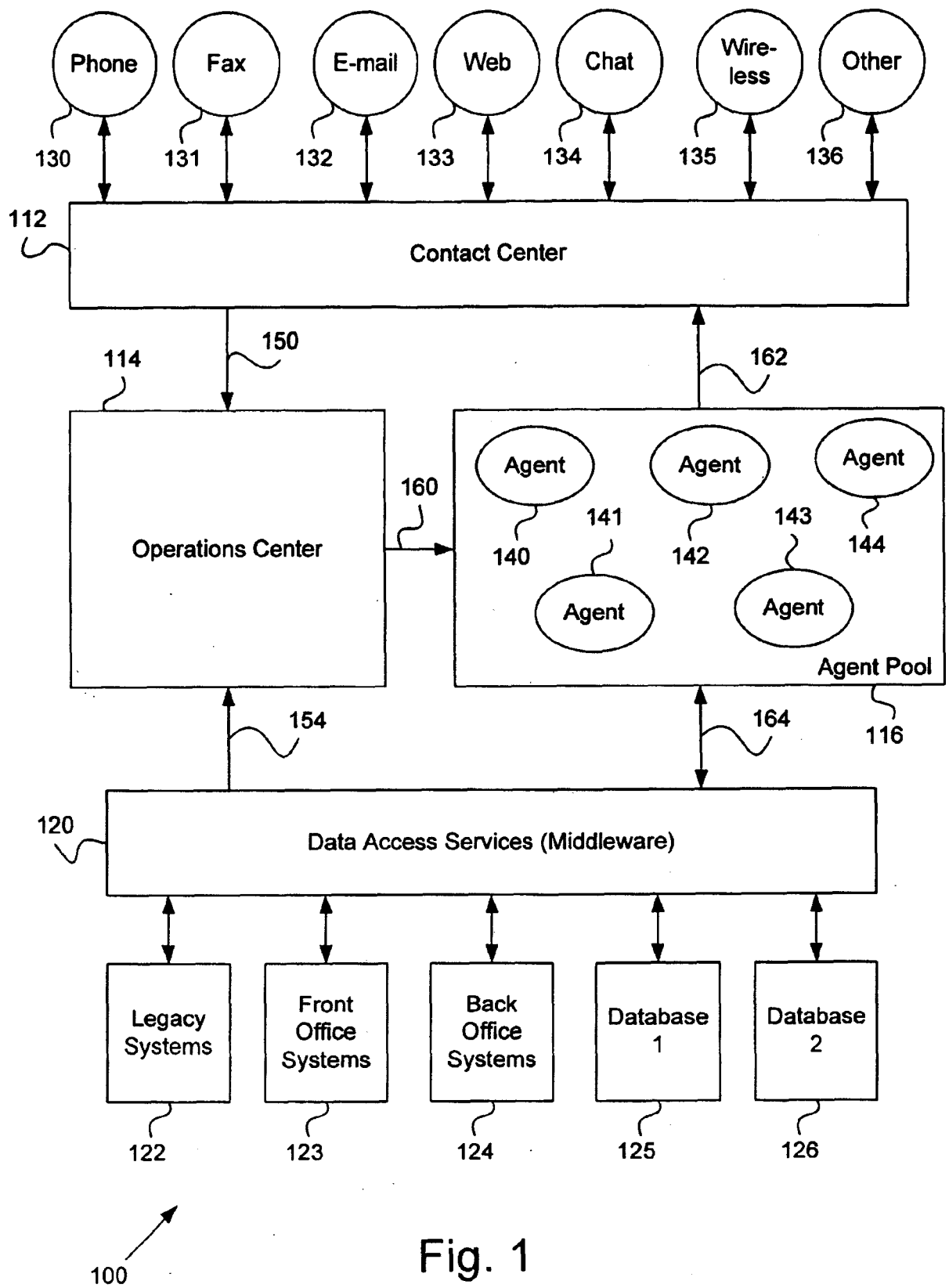
Figure 2:
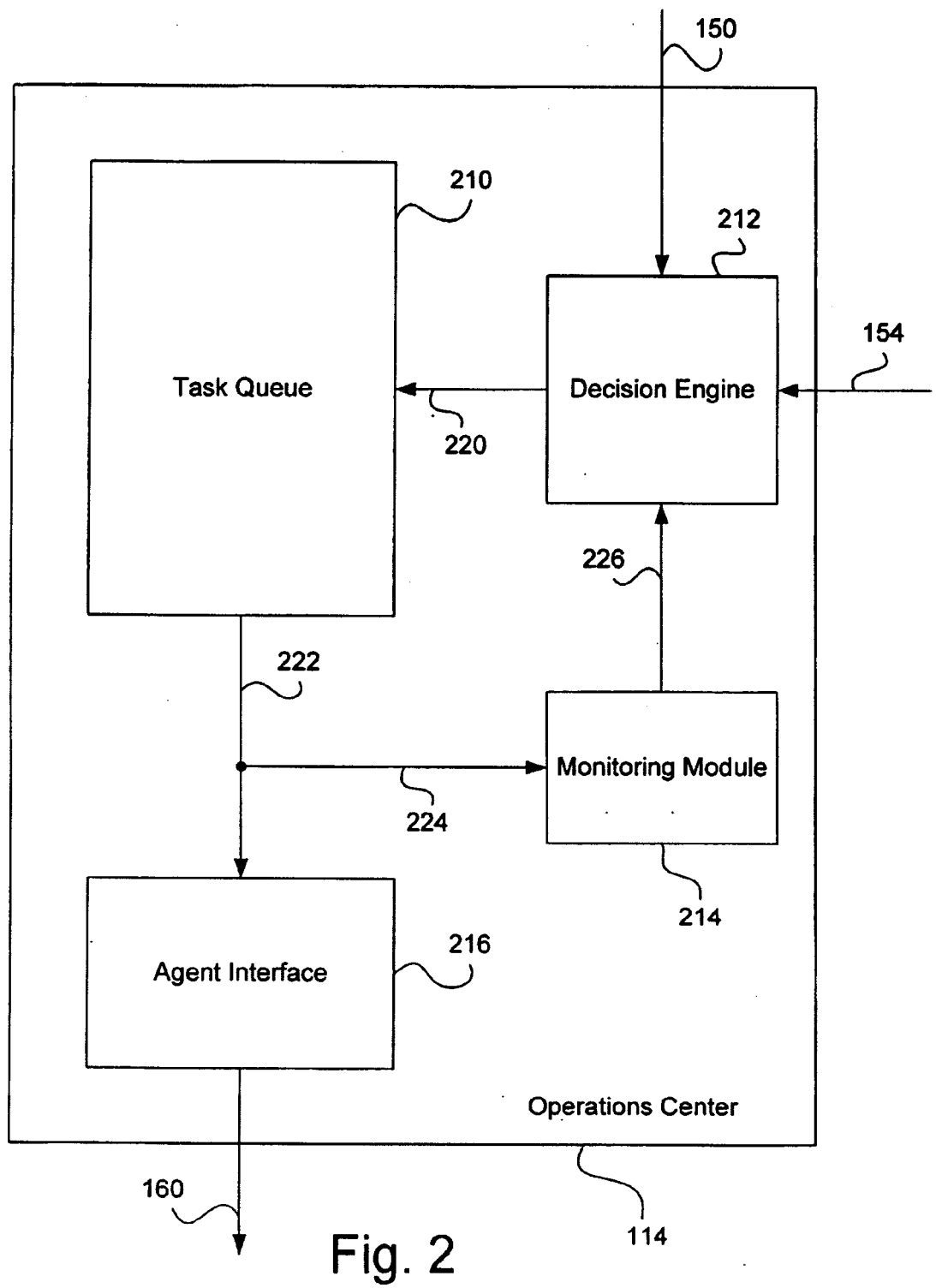
Figure 3:
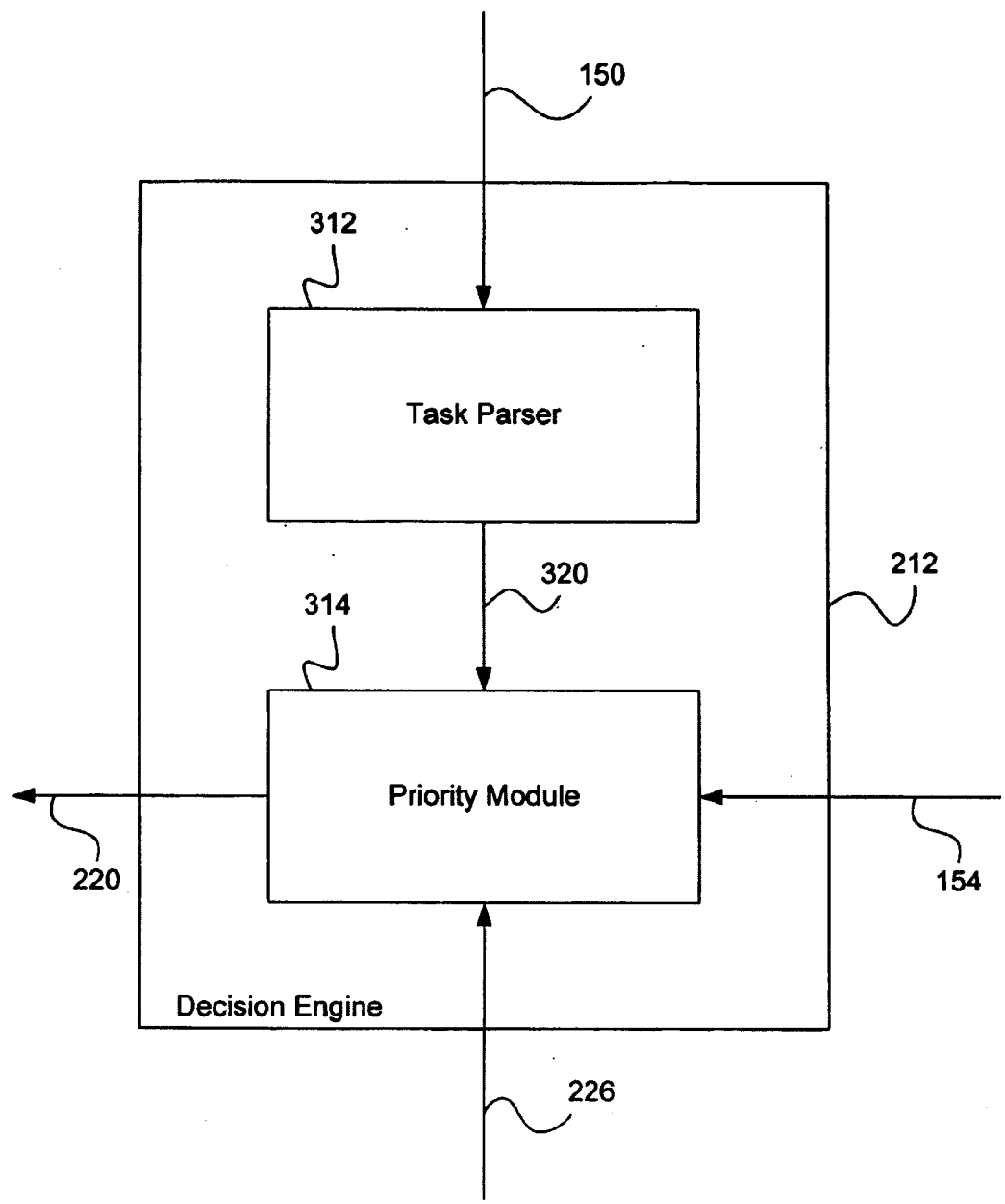
Figure 4:
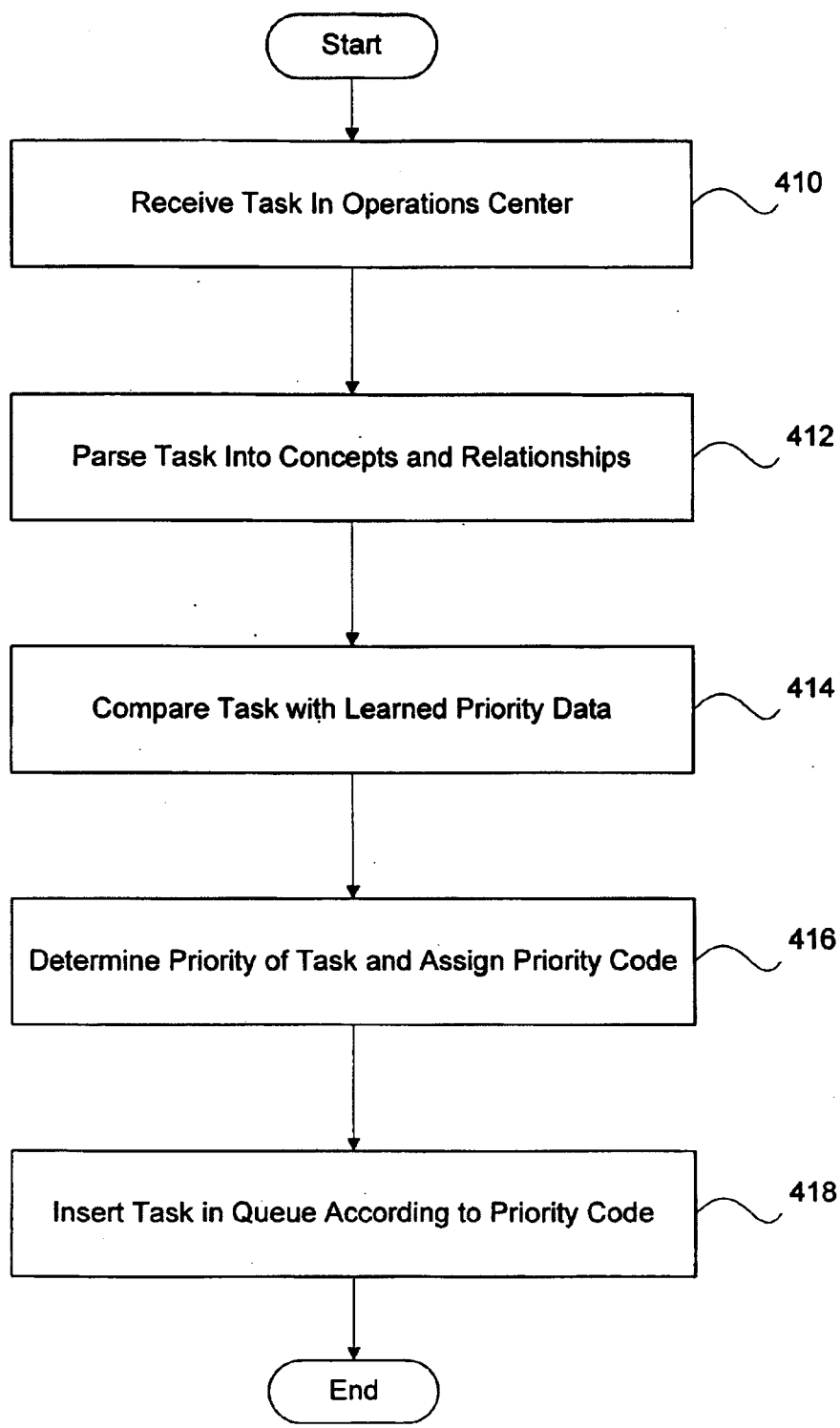

FIG. 5 is a flowchart of method steps for updating the FIG. 2 decision engine 212 in accordance with one embodiment of the invention. First, in step 510, agent 140 for example selects a task from task queue 210. Agent 140 selects the task based on priority as established by a user of system 100. The position of the task in task queue 210 preferably reflects the task's priority relative to the priorities of other tasks in task queue 210.

Next, in step 512, monitoring module 214 monitors the task selected and its priority code. In step 514, monitoring module 214 inputs the task and its priority code via path 226 to priority module 314. Then, in step 516, priority module 314 uses the task's content and priority code to update the priority data. The task's content includes concepts and their relationships.

The invention has been explained above with reference to a preferred embodiment. Other embodiments will be apparent to those skilled in the art in light of this disclosure. For example, the invention may readily be implemented using configurations other than those described in the preferred embodiment above. Additionally, the invention may effectively be used in conjunction with systems other than the one described above as the preferred embodiment. Therefore, these and other variations upon the preferred embodiment are intended to be covered by the invention, which is limited only by the appended claims.

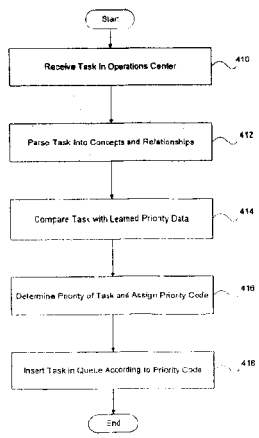

What is claimed is:

1. A system comprising:
   a contact center configured to receive items, which are communications or tasks;
   a decision engine that
      determines a priority code for each of the items received according to rules for prioritizing the items,
      is capable of determining the priority code for items without an assigned priority, and
      is capable of learning new rules for prioritizing items based on positive and negative feedback related to a relative importance of items based on an order in which an agent selected the items; and
   at least one queue configured to store the items in order of the priority code.

2. A system comprising:
   a contact center configured to receive items, which are communications or tasks;
   a decision engine that
      determines a priority code for each of the items received according to rules for prioritizing the items,
      is capable of determining the priority code for items without an assigned priority, and
      is capable of learning new rules for prioritizing items based on a relative importance of items learned from an order in which an agent selected the items, and
   includes
      a parser and is configured to analyze text, voice, natural language content, emotional content, identify keywords, identify concepts, and
      determine relationships between the concepts of the items received; and
   at least one queue configured to store the items in order of the priority code.

3. A method comprising:
   receiving items, which are communications or tasks that do not have a previously assigned priority;
   automatically learning a new priority rule based on an order in which an agent selected the items;
   automatically determining priority codes for the items using the new priority rule;
   parsing the items including
      analyzing text contents of items containing text of the items,
      analyzing voice contents of items having voice contents of the items, analyzing natural language contents of items containing natural language of the items, analyzing emotional contents of items having emotional content of the items, identifying keywords of items containing words of the items, identifying concepts of items of the item that contain concepts, and determining relationships between the concepts of items having relationships between the concepts of the items; and storing the items, which are prioritized in at least one queue according to the priority code.

* * * * *

UNITED STATES PATENT AND TRADEMARK OFFICE
CERTIFICATE OF CORRECTION

PATENT NO.         : 6,961,720 B1
APPLICATION NO. : 10/008152
DATED              : Nov. 1, 2005
INVENTOR(S)        : Nelken It is certified that error appears in the above-identified patent and that said Letters Patent is hereby corrected as shown below:

The title page showing the print figure should be deleted, and replaced with the attached amended title page.
Drawing sheets, cosisting of Fig. 1, 2, 3, and 4 should be deleted and replace with the drawing sheets, consisting ofFig. 1, 2, 3, and 4 as shown on the attached pages.

Signed and Sealed this

.Seventh Day of November, 2006

JON W. DUDAS
*Director of the United States Patent and Trademark Office*

(12) United States Patent
Nelken

(10) Patent No.: US 6,961,720 B1
(45) Date of Patent: Nov. 1, 2005

(54) SYSTEM AND METHOD FOR AUTOMATIC TASK PRIORITIZATION

(75) Inventor: Yoram Nelken, Jerusalem (IL)

(73) Assignee: iPhrase Technologies, Inc., Bedford, MA (US)

( * ) Notice: Subject to any disclaimer, the term of this patent is extended or adjusted under 35 U.S.C. 154(b) by 202 days.

(21) Appl. No.: 10/008,152

(22) Filed: Dec. 4, 2001

Related U.S. Application Data

(63) Continuation of application No. 09/602,588, filed on Jun. 21, 2000, now Pat. No. 6,408,277.

(51) Int. Cl.[7] .................. G06F 17/00; G06F 15/18
(52) U.S. Cl. .......................... 706/47; 706/16
(58) Field of Search .................... 706/47, 16

(56) References Cited

U.S. PATENT DOCUMENTS

| | | |
|---|---|---|
| 3,648,253 A | 3/1972 | Mullery et al. |
| 4,286,322 A | 8/1981 | Hoffman et al. |
| 4,642,756 A | 2/1987 | Sherrod |
| 4,658,370 A * | 4/1987 | Erman et al. ............ 706/60 |
| 4,805,107 A | 2/1989 | Kieckhafer et al. |
| 4,814,974 A | 3/1989 | Narayanan et al. |
| 4,942,527 A | 7/1990 | Schumacher |
| 5,040,141 A | 8/1991 | Yazima et al. |
| 5,068,789 A | 11/1991 | van Vliembergen |
| 5,099,425 A | 3/1992 | Yuji et al. |
| 5,101,349 A | 3/1992 | Tokuume et al. |
| 5,210,872 A | 5/1993 | Ferguson et al. |
| 5,228,116 A * | 7/1993 | Harris et al. ............ 706/50 |
| 5,230,054 A | 7/1993 | Tamura |
| 5,247,677 A | 9/1993 | Welland et al. |
| 5,251,131 A | 10/1993 | Masand et al. |
| 5,265,033 A | 11/1993 | Vajk et al. |
| 5,321,608 A | 6/1994 | Namba et al. |
| 5,325,526 A | 6/1994 | Cameron et al. |
| 5,369,570 A | 11/1994 | Parad |
| 5,371,807 A | 12/1994 | Register et al. |
| 5,377,354 A | 12/1994 | Scannell et al. |
| 5,437,032 A | 7/1995 | Wolf et al. |
| 5,483,466 A | 1/1996 | Kawahara et al. |
| 5,487,100 A | 1/1996 | Kane |
| 5,493,692 A | 2/1996 | Theimer et al. |
| 5,526,521 A | 6/1996 | Fitch et al. |
| 5,542,088 A | 7/1996 | Jennings, Jr. et al. |
| 5,559,710 A | 9/1996 | Shahraray et al. |

(Continued)

FOREIGN PATENT DOCUMENTS

WO    WO 00/36487 A2    6/2000

OTHER PUBLICATIONS

Webster's Third New International Dictionary, G.&C. Meriam Company, 1961, pp. 538, 834, 1460.

(Continued)

*Primary Examiner*—George Davis
(74) *Attorney, Agent, or Firm*—Carr & Ferrell LLP

(57) ABSTRACT

A system and method for electronic communication management comprises a universal data model, a modeling engine, and an adaptive knowledge base. The modeling engine includes a natural language processor and a statistical modeler. A communication is translated from its native format into the universal data model. The modeling engine determines the intent of the communication using the natural language processor and the statistical modeler. A response is generated, either automatically or by an agent. An audit module analyzes each response and provides feedback to the modeling engine and the adaptive knowledge base. The modeling engine uses the feedback to update models in the adaptive knowledge base. The modeling engine supports various application specific modules.

3 Claims, 5 Drawing Sheets